(12) United States Patent
Pan et al.

(10) Patent No.: US 8,049,894 B2
(45) Date of Patent: Nov. 1, 2011

(54) MULTIPLE WAVELENGTH OPTICAL ANALYZER DEVICE

(75) Inventors: Jing Jong Pan, Milpitas, CA (US);
Zhengda Pang, Livermore, CA (US);
Yonghong Guo, Fremont, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 349 days.

(21) Appl. No.: 11/867,956

(22) Filed: Oct. 5, 2007

(65) Prior Publication Data

US 2009/0091759 A1 Apr. 9, 2009

(51) Int. Cl.
*G01J 3/51* (2006.01)
*H01J 40/14* (2006.01)

(52) U.S. Cl. .................................. 356/418; 250/226

(58) Field of Classification Search ............ 398/85, 398/149; 356/416–420
See application file for complete search history.

(56) References Cited

U.S. PATENT DOCUMENTS

| | | | |
|---|---|---|---|
| 4,084,909 A * | 4/1978 | Mathisen | 356/332 |
| 4,738,535 A * | 4/1988 | Webster | 356/418 |
| 5,245,179 A | 9/1993 | Chang | 250/226 |
| 5,729,347 A * | 3/1998 | So | 356/416 |
| 6,157,025 A * | 12/2000 | Katagiri et al. | 356/418 |
| 6,704,509 B1 | 3/2004 | Yang et al. | |
| 6,714,743 B2 | 3/2004 | Hsieh et al. | |
| 6,975,395 B1 | 12/2005 | Gentieu et al. | |
| 7,002,697 B2 | 2/2006 | Domash et al. | |
| 7,046,874 B2 * | 5/2006 | Xu et al. | 385/24 |
| 7,113,282 B2 * | 9/2006 | Aguirre et al. | 356/418 |
| 7,130,505 B2 | 10/2006 | Shen | |
| 2003/0048498 A1 | 3/2003 | Pearson et al. | |
| 2004/0264967 A1* | 12/2004 | Noirie | 398/85 |
| 2007/0166040 A1* | 7/2007 | Jang et al. | 398/85 |

OTHER PUBLICATIONS

Electronic Product News "Why Thin Film Filter Success Exceeds Expectations", Jan. 8, 2006.*

* cited by examiner

*Primary Examiner* — Gregory J Toatley
*Assistant Examiner* — Rebecca C Slomski
(74) *Attorney, Agent, or Firm* — Aka Chan LLP

(57) ABSTRACT

A device and method of operation for analyzing signal features over multiple optical wavelengths is presented. A plurality of rotating thin film filters is arranged with respect to a collimated beam of light so that each thin film filter transmits light of a particular wavelength to a detector unit responsive to an angle of incidence of light upon the thin film filter when the thin film filter optically interposes the collimated light beam. Each of the plurality of thin film filters is optically interposed periodically and rotated so that the angle of incidence of light from the first input unit upon the thin film filter varies when the thin film filter is optically interposed to scan the light by wavelength within a selected wavelength band into a detector unit for measurement.

25 Claims, 9 Drawing Sheets

MULTIPLE WAVELENGTH OPTICAL ANALYZER DEVICE

BACKGROUND OF THE INVENTION

This invention is related to optical devices for analyzing signal features at multiple optical wavelengths and is particularly adapted to monitoring a plurality of wavelength communication channels in an optical network.

Current optical networks typically use a particular wavelength of light to define a communication channel so that multiple communication channels can be carried on a single optical fiber. DWDM (Dense Wavelength Division Multiplexing) networks are such networks in which an ITU (International Telecommunications Union) standard specifies the particular channel wavelengths and the spacings between these channels. DWDM is based upon WDM (Wavelength Division Multiplexing), an earlier ITU standard in which a smaller number of wavelength channels are carried by an optical fiber with the channels further spaced apart. It should be noted that the term DWDM, as used herein, refers to the more inclusive sense of wavelength definition of communication channels so as to include the ITU WDM and DWDM standards, unless specifically stated otherwise.

To properly administer the increasing load of data, voice and video information signals transported over optical networks, optical channel monitors (OCMs) are used to measure the wavelength, power and signal-to-noise ratio of each communication channel. Many different optical elements have been used in OCMs to decompose optical fiber signals into their wavelength components for monitoring. These elements include wavelength dispersive elements, such as gratings, Fabry-Perot etalons, thin film filters, linear variable filters, and AWGs (Array WaveGuides). Single and arrays of multiple photodetectors are used to detect the dispersed wavelength signals. Nonetheless, despite varied arrangements of such optical elements, OCMs still suffer from numerous infirmities, including poor or slow performance, and high costs of manufacture.

The present invention solves or substantially ameliorates these problems. Furthermore, the present invention is also adaptable to function as an analyzer device for measuring properties of light at multiple optical wavelengths, such as an optical performance monitor, an optical wavelength meter, a DWDM spectrum analyzer, an optical spectrometer, and other instruments which analyze light by its constituent wavelengths.

BRIEF SUMMARY OF THE INVENTION

In one embodiment the present invention provides for a multiple optical wavelength analyzer device for measuring properties of light in a waveguide, such as an optical fiber. The device has a first input unit directing the light from the waveguide; a first detector unit for receiving the light from the input unit; a plurality of thin film filters mounted to a table and arranged with respect to the first input unit and the first detector unit so that each thin film filter transmits light of a particular wavelength to the first detector unit responsive to an angle of incidence of light from the first input unit upon the thin film filter when the thin film filter is optically interposed between the first input unit and the first detector unit; and a motor for rotating the table. Each of the plurality of thin film filters is optically interposed between the first input unit and the first detector unit periodically and rotated so that the angle of incidence of light from the first input unit upon the thin film filter is varied when the thin film filter is optically interposed between the first input unit and the first detector unit. The result is that each thin film filter scans the light from the waveguide by wavelength within a selected wavelength band into the first detector unit for measurement. The multiple filters can be designed so that the selected wavebands are continuous to each other so that one large wavelength range is scanned.

In a second embodiment the present invention provides for a method of measuring properties of light. The method has the steps of: directing the light in a collimated beam; scanning the beam with a plurality of thin film filters repetitively with a period less than a second, each thin film filter having a characteristic wavelength; receiving the scanned beam in a plurality of wavebands, each of the scanned plurality of wavebands centered about the characteristic wavelength of each thin film filter; and determining a wavelength of a signal feature in a scanned waveband by a temporal displacement of the signal feature from the characteristic wavelength.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
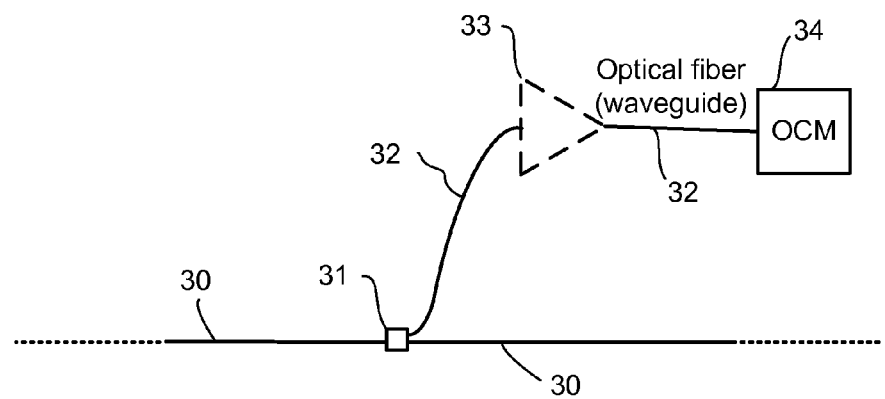
FIG. 1 illustrates how an OCM might be connected to an optical network.

FIG. 1 illustrates how an OCM might be used in an optical network, such as a DWDM network. An optical fiber 30 represents a part of the network, an optical fiber whose communication channels are to be monitored. The rest of the network is not shown. A tap 31 splits a portion of the wavelength communication channel signals to an optical fiber 32 which leads to an OCM 34. If the strength of the signals is insufficient, an optional optical amplifier 33 indicated by dotted lines, can be used to boost the signals for the OCM 34.

Figure 2B:
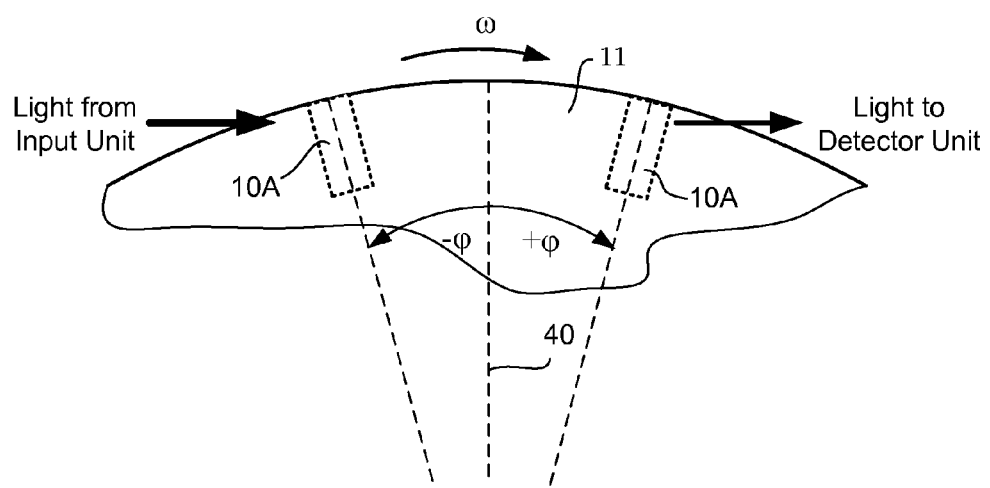
FIG. 2B shows a detail of the thin film filters on the table of the FIG. 2A OCM.
Figure 2A:
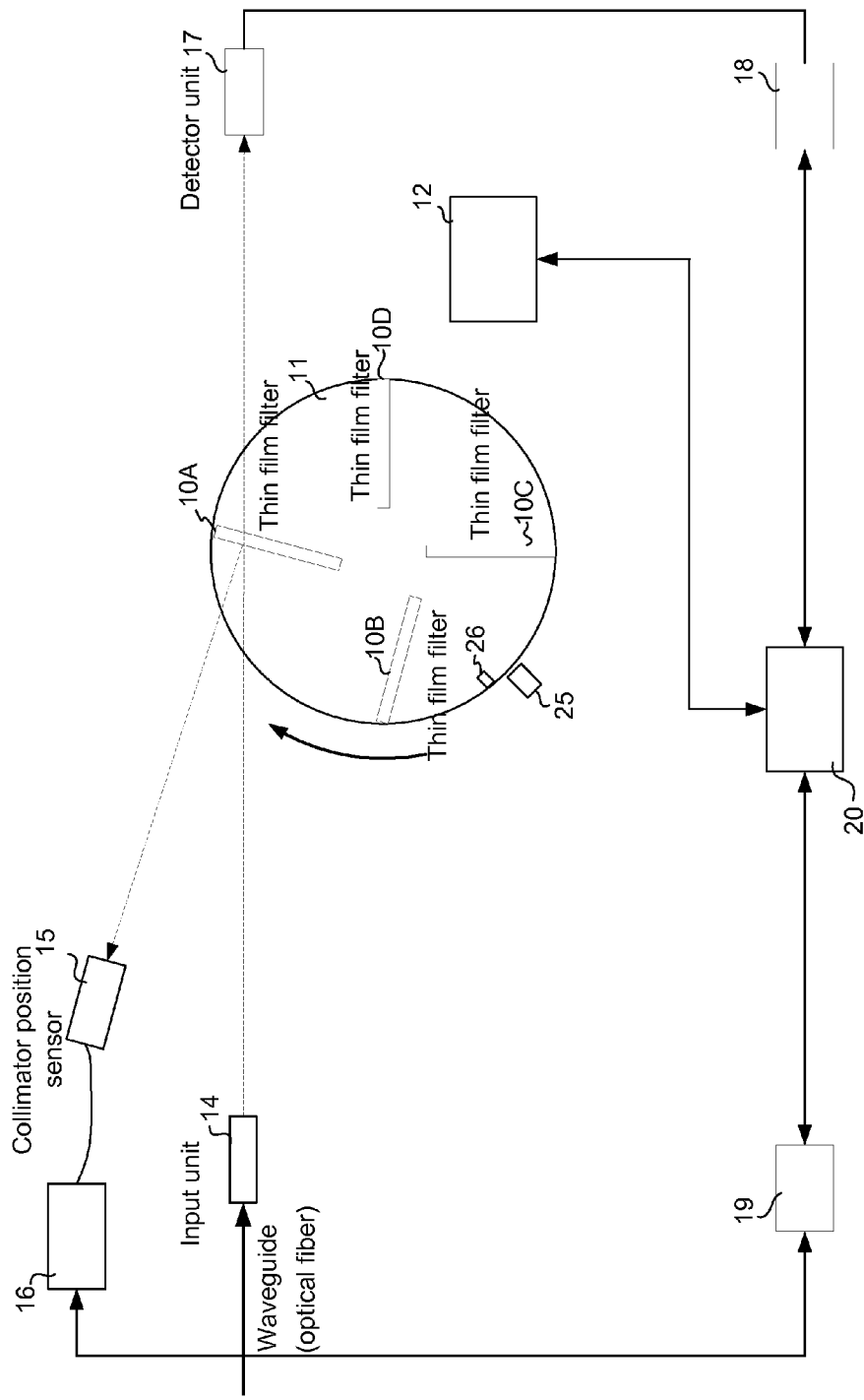
FIG. 2A shows a general arrangement of one embodiment of the present invention.

FIG. 2A shows the general arrangement of one embodiment of the present invention which is particularly suitable as an OCM. The light from a waveguide, such as the optical fiber 32 of FIG. 1, is collimated at an input unit 14, which is formed by the terminus of the optical fiber and a collimator lens. The input unit 14 directs the light in collimated beam toward a detector unit 17, which has a lens and a photodetector. The lens focuses the light received by the detector unit 17 onto the photodetector. The construction of input and output units, such as units 14 and 17, are well-known to optical designers.

Intermediate the input unit 14 and output unit 17 is a plurality of thin film filters 10A-10D, four in this embodiment, are mounted to a rotating table 11. The table 11 is driven by a motor 12 controlled by a computer 20, including a CPU (Central Processing Unit) and coupled memory. The action of the table 11 rotates the thin film filters 10A-10D so that each one of the thin film filters 10A-10D is periodically optically interposed between the input unit 14 and the detector unit 17. The thin film filter 10A-10D transmits light of a particular wavelength to the detector unit 17 responsive to the angle of incidence of light from the input unit 14 upon the thin film filter and blocks out light at other wavelengths. As the angle of incidence of light is varied with the rotation of the table 11, the thin film filter scans the light from the input unit 14 by wavelength within a selected wavelength band into the detector unit 17. As one thin film filter 10A-10D rotates away from optical interposition between the input unit 14 and the detector unit 17, another filter rotates into optical interposition. With each thin film filter 10A-10D filtering light at different selected wavebands, a large section of the optical spectrum can be scanned. For example, the four thin film filters 10A-10D can be selected to filter four contiguous wavebands so that the entire DWDM C-band, i.e., 1525-1565 nm, is scanned.

FIG. 2B details the scanning action of the thin film filters 10A-10D with one of the thin film filters, 10A in this case, as representative. Each thin film filter 10A-10D is constructed so that when light strikes that filter perpendicularly, only light at a characteristic wavelength $\lambda_0$ (and a certain narrow transmission waveband centered about the particular wavelength) is transmitted. As in most applications of this type of filtering, it is very desirable that each thin film filter have a transmission waveband which is as narrow and as flat as possible. In FIG. 2B in which a portion of the table 11 is illustrated, the position at which the light from the input unit 14 is perpendicularly incident upon the filter 10A is represented by a dotted reference line 40 which passes through the axis of rotation of the table 11. The wavelength of the filtered light is changed as the thin film filter is angled with respect to the incident light as the table 11 rotates.

In the operation of the described OCM, a thin film filter, i.e., the filter 10A in this example, rotates into optical interposition between the input unit 14 and the detector unit 17 at a rotational speed ω, and the filter filters light at a wavelength which becomes longer as the filter 10A moves toward the dotted reference line 40 (the angle of incidence becomes smaller) and then shorter as the filter 10A moves away from the reference line 40 (the angle of incidence becomes larger). Thus a waveband is scanned centered about the characteristic wavelength $\lambda_0$ for the filter 10A by the rotation of the filter through the reference line 40. As indicated by the angles, $-\phi$ and $+\phi$, the thin film filters are in optical interposition when $\phi$ is approximately ±10° about the reference line 40, relatively small angles. These relatively small angles create a small walk-off for the light through the filters 10A-10D. Only a focusing lens is required for the detector unit 17. In contrast, in some OCMs found in the prior art a single thin film filter is used to scan a wide waveband. The resulting large walk-offs require large and cumbersome compensatory optical blanks for a photodetector to receive the light of the filtered waveband.

Returning to the FIG. 2A, signal features in the wavebands scanned by the thin film filters 10A-10C are received by the detector unit 17 whose photodetector generates an analog electrical output in response to the light received. The analog output is digitized by an analog-to-digital (A/D) circuit 18 and sent to the computer 20. Likewise, the analog output from a power monitor 16 which receives optical signals from a collimator position sensor 15 is digitized by a second analog-to-digital (A/D) circuit 19 and sent to the computer 20. The digitization of these analog signal features permits the efficacious and powerful techniques of digital processing to be applied by the computer 20.

The collimator position sensor 15 receives the light reflected by the thin film filters 10A-10D and, together with the output from an induction sensor 25, the output of the collimator position sensor 15 helps determine the rotational position of the table 11. The position of the table 11 in turn determines the transmitted wavelength of light through each of the thin film filters 10A-10D, and the corresponding wavelength of the light reaching the detector unit 17. In this manner the output of the detector unit 17 can be correlated to the wavelength of light reaching the detector unit 17.

Figure 3:
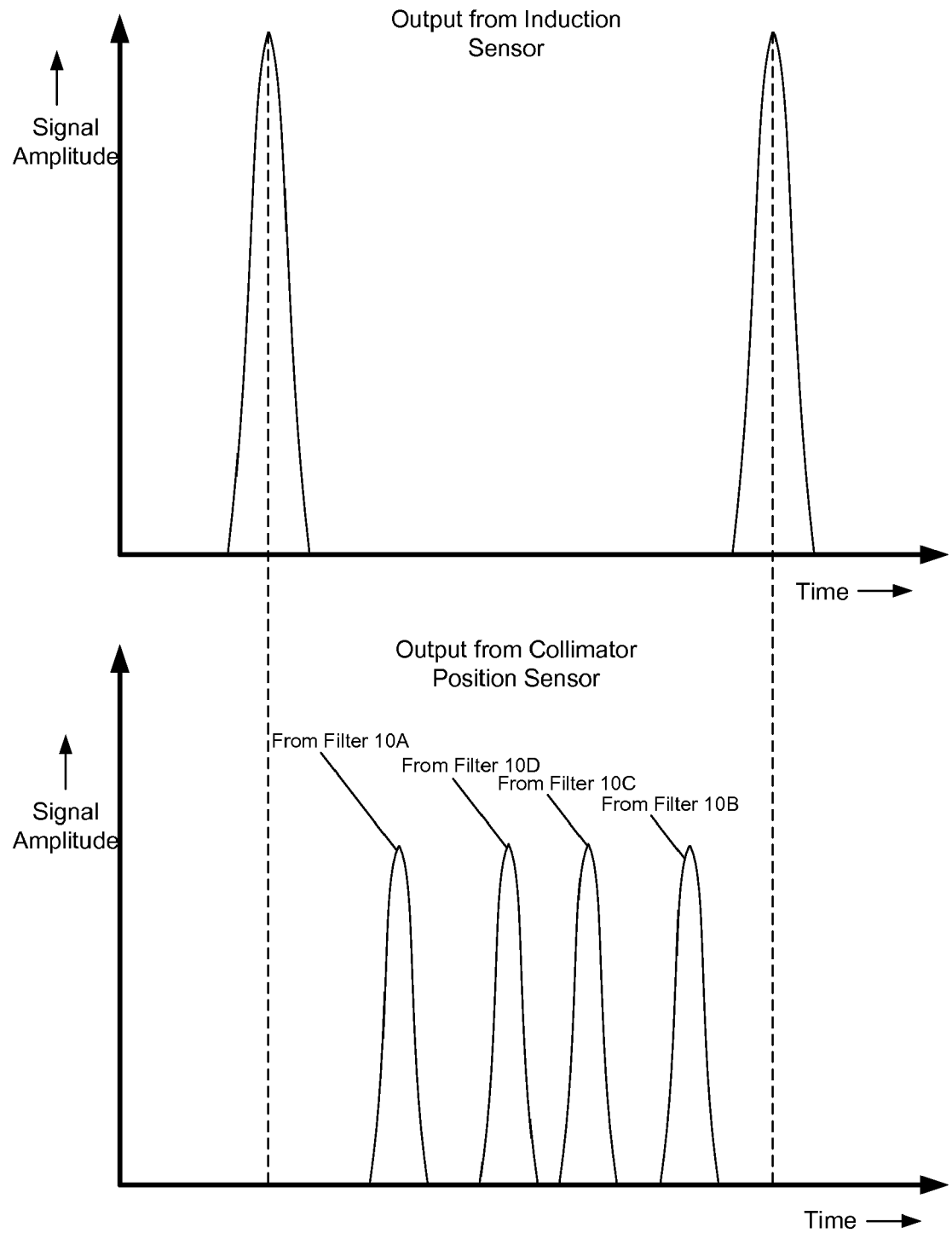
FIG. 3 is a representation of the output of the induction sensor with the output of the collimator position sensor of FIG. 2.

The sensor 25, which is mounted near the circumference of the table 11 detects by induction the passing of a small magnet 26 mounted at the table's circumference and preferably on the opposite side of the table so as not to interfere with the operation of the thin film filters 10A-10D. The induction sensor output signal is repeated every revolution of the table 11. Also with each revolution of the table 11, the collimator position sensor 15 generates four output signals, one from each of the thin film filters 10A-10D. This is illustrated by FIG. 3 in which the collimator position sensor output signals generated by the reflections off the thin film filters 10A-10D are shown between two induction sensor output signals. After an induction sensor output signal, four collimator position sensor output signals follow before the induction sensor output signal appears again. To better distinguish the reflection off one thin film filter from another, each thin film filter 10A-10D is mounted on the table 11 so that light reflected from each thin film filter 10A-10D does not occur at regular intervals. Hence the time intervals between the collimator position sensor output signals appear to be irregular in FIG. 3.

The output signal from the induction sensor 26 also helps to determine the rotational speed of the table 11, which should remain constant as possible. A motor for rotating computer hard disks is used for the drive motor 12 in FIG. 2A. Such motors rotate in the neighborhood of 3000 rpm so it should be evident that the signals and scanned signal features described with respect to FIG. 3 above and FIG. 4 below are generated periodically at high rates and short periods. At 3000 rpm, a signal feature is scanned 50 times a second, or with a period of 0.02 seconds. Hence the rotation of a particular thin film filter 10A-10D into optical interposition can be determined with reference to the collimator position sensor output signal and identifying time intervals between the collimator position sensor output signals.

Figure 4:
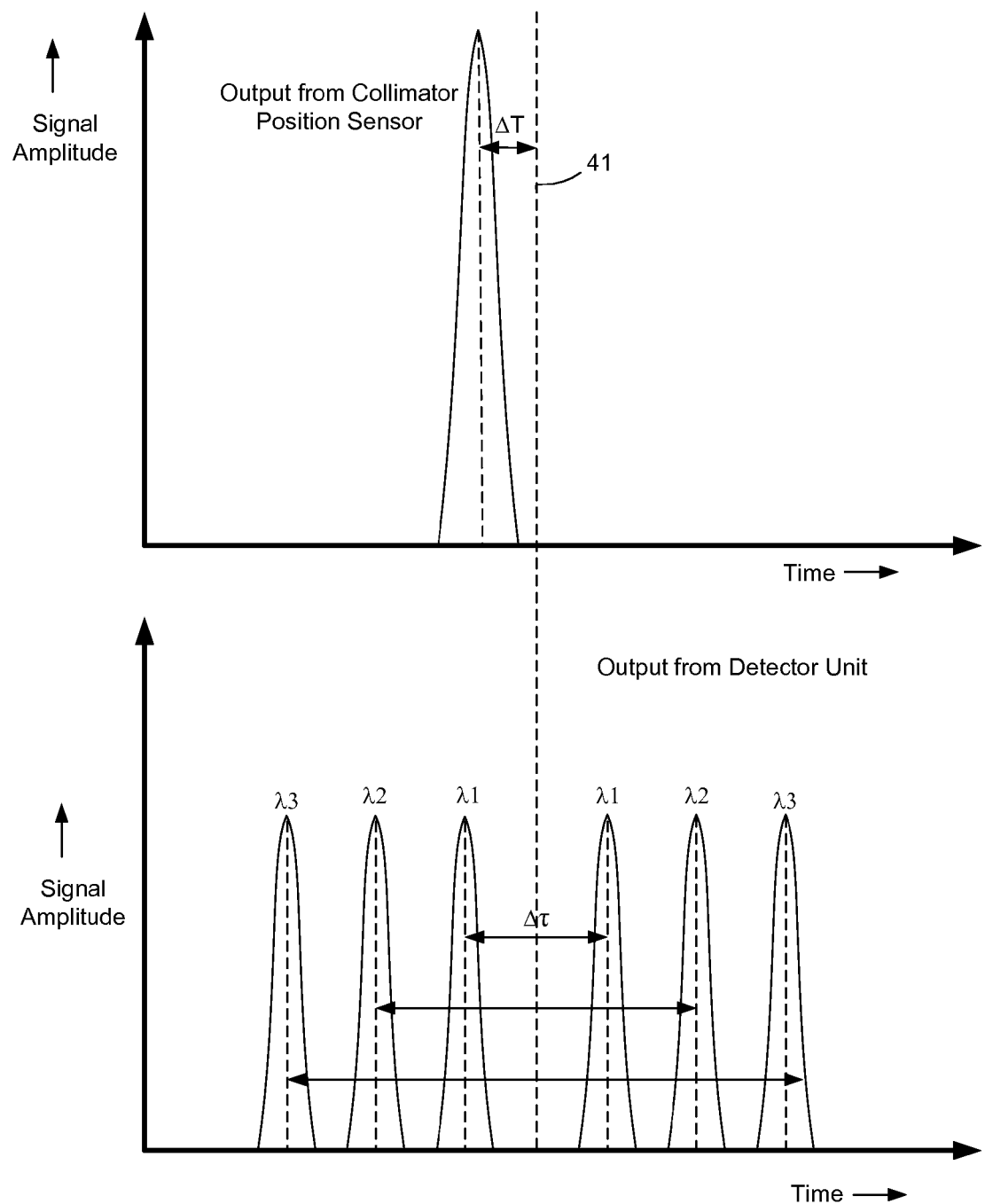
FIG. 4 is a representation of the output of the collimator position sensor with the output of the detector unit of FIG. 2.

The determination of the wavelength of a signal feature scanned by the particular filter is illustrated in FIG. 4 which shows the collimator position sensor output signal and a representative output from one of the thin film filters 10A-10D. As an example, it is assumed that the filter scans three wavelength signals at, say, $\lambda 1$, $\lambda 2$ and $\lambda 3$. The signals can be in WDM wavelength communication channels, for example. As described earlier, the wavelength signals, $\lambda 1$, $\lambda 2$ and $\lambda 3$, appear symmetrically about a reference line 41 which marks the filter's rotational position at which any light from the input unit 14 is incident perpendicularly to the filter's surface. The reference line 41 corresponds to the dotted line 40 for the filter 10A in FIG. 2B and marks the characteristic wavelength $\lambda_0$ of the filter. Each signal feature is "mirrored" about the characteristic wavelength of the filter. The temporal displacement, $\Delta\tau/2$ in FIG. 4, of a signal feature from the reference line 41 of the filter's characteristic wavelength determines the wavelength of the signal feature, and the location of the line 41 is determined by its temporal displacement $\Delta T$ from the filter's output signal from the collimator position output sensor 15. If the wavelengths of the signals at $\lambda 1$, $\lambda 2$ and $\lambda 3$ are known, the temporal displacement $\Delta\tau/2$ of any signal feature can be calibrated to its wavelength. Alternatively, $\Delta\tau$ can be used for each signal feature with the location of line 41 used to match the mirrored signal features with each other. Furthermore, if the signal strengths of the signals at $\lambda 1$, $\lambda 2$ and $\lambda 3$ are also known, then the detected signal strengths can also be calibrated to the signal strength received by the detector unit 17. Once wavelength is calibrated with respect to temporal displacement, whether $\Delta\tau/2$ or $\Delta\tau$, look-up tables can store the calibration results in the memory of the computer 20.

Figure 5A:
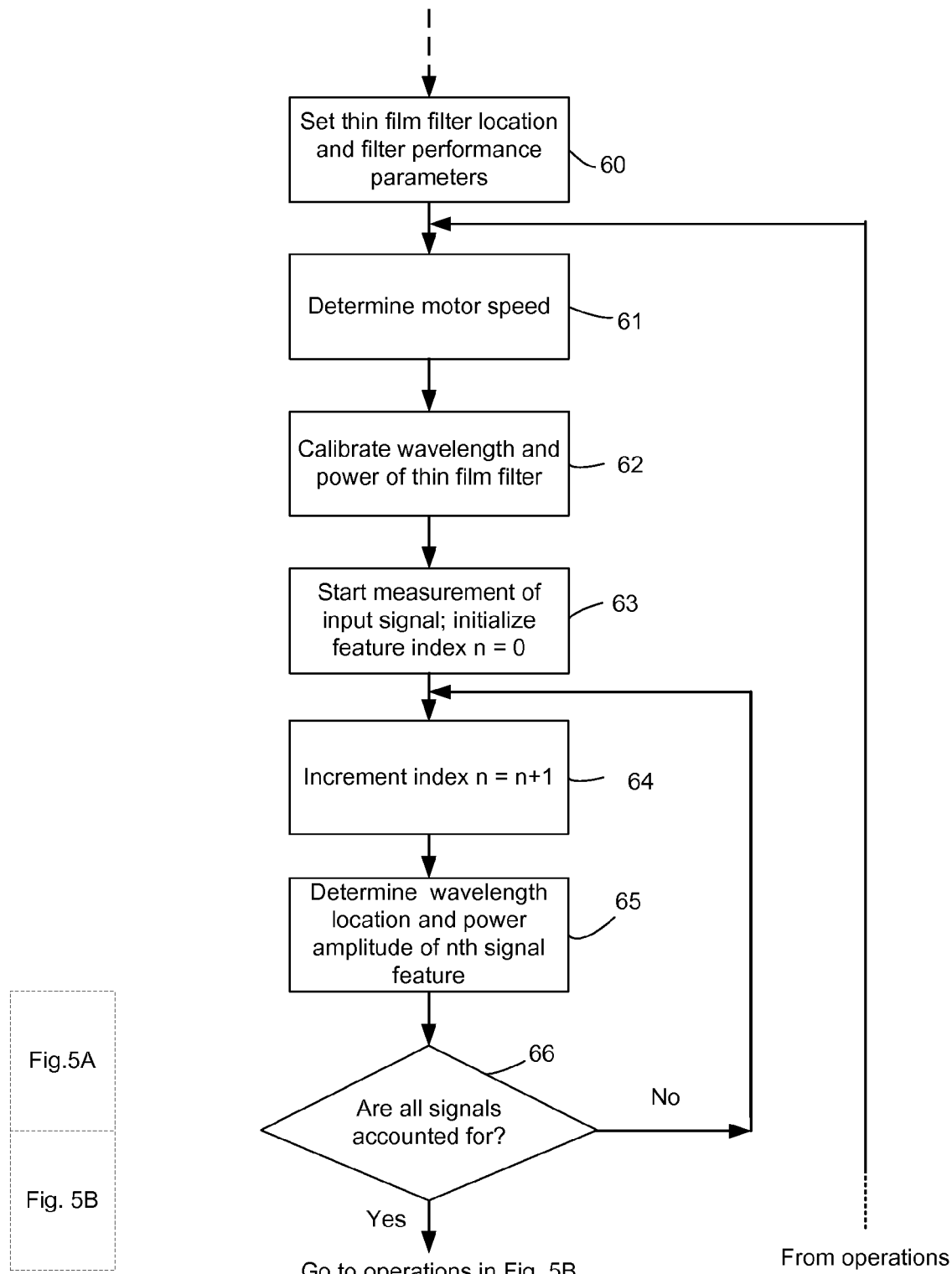
FIGS. 5A and 5B illustrate a flow chart of operations of the FIG. 2A OCM.
Figure 5B:
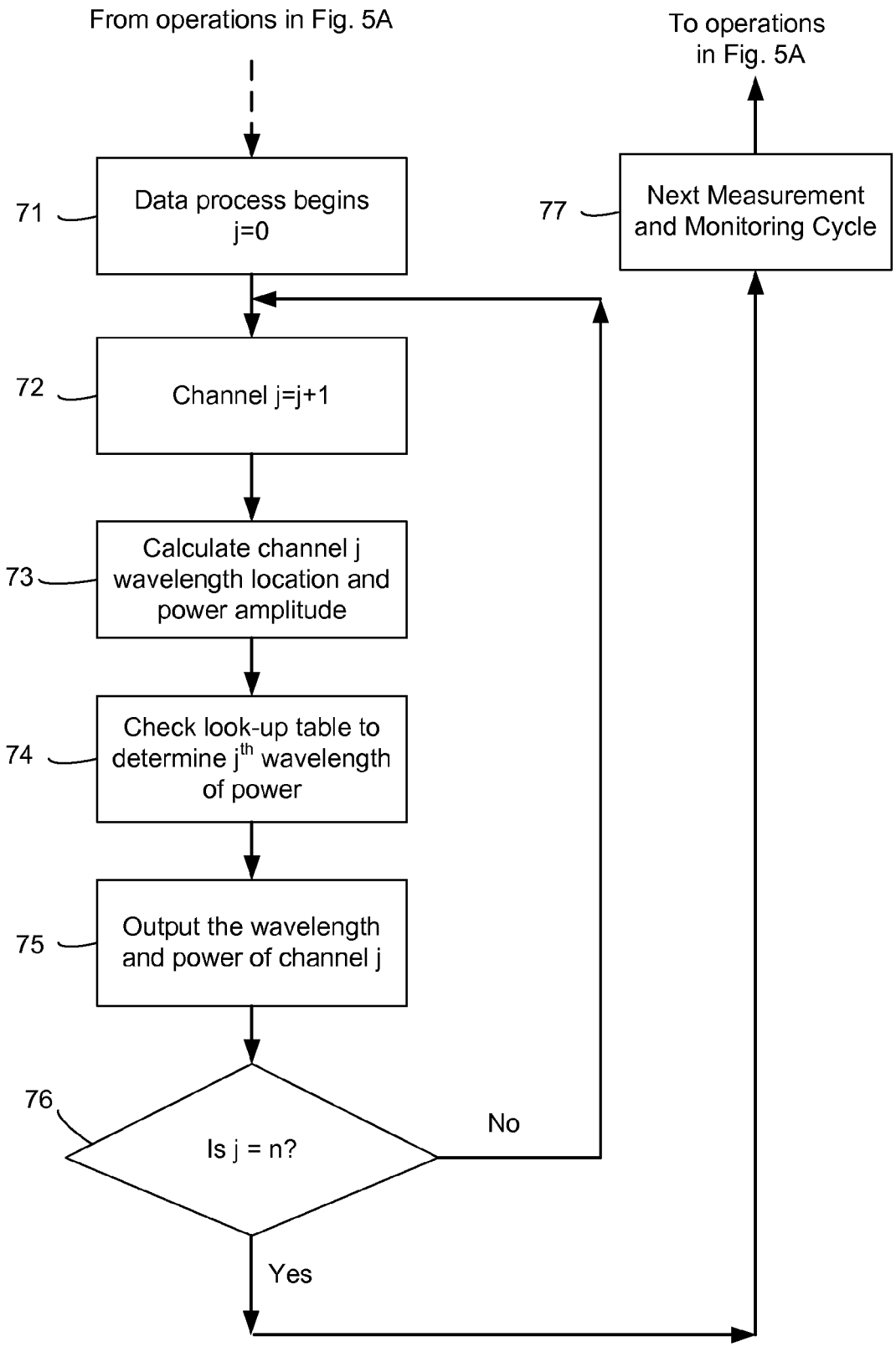

FIGS. 5A and 5B are flow charts of the general operations of an optical channel monitor according to one embodiment of the present invention. In step 60, which is reached by a dotted arrow indicating that many initialization steps have already been performed, the rotational locations of the thin film filters and their performance parameters are set in the OCM. In step 61 the table 11 is determined to be indeed rotating at the constant speed $\omega$. Step 62 calibrates the thin film filters 10A-10D with respect to wavelength and power, as described above.

With the calibration of the thin film filters, step 63 starts the ordinary operations of the OCM, the measurement of features found in the input signal received by the detector unit 17 of the OCM, that is, what signals are detected by the unit 17. The n feature index is initialized to zero. The channels indexed by n are the same as DWDM channels. In step 64 the index n for the signal features is incremented and the wavelength of the $n^{th}$ signal feature and its power amplitude is determined and recorded in step 65. Decision step 66 asks whether the last signal feature has been found. If not, then the process returns to step 63. The looped steps 64-66 determine the wavelengths and signal strengths of all the signal features in the input signal and perform a signal "capture" function. If the decision step 66 is yes, i.e., all the signal features are accounted for and captured, the process moves to step 71 in FIG. 5B which begins the process of matching the measured signal features with the optical channels.

In step 71 the process moves to processing the recorded data for the monitored wavelength channels for the OCM; the index j for the monitored channels is initialized. For this embodiment of the present invention, the OCM is assumed to be monitoring channels of a DWDM network. In step 72 the channel index j is incremented and in step 73 the channel j wavelength location and power amplitude is determined from the recorded data. In step 74 the look-up table is checked to determine the first wavelength of power. The wavelength and power of channel j is then sent as output in step 75; the monitored results of channel j. Decision step 76 asks whether j is equal to n, i.e., whether the last signal feature has been accounted for by the monitored DWDM channels. If not, then the process returns to step 72. If yes, the next measurement and monitoring cycle is started and the process returns to step 61 in FIG. 5A so that a new set of measurements are performed on the input signal and the signal features checked against the monitored channels.

The operations with respect to the flow charts of FIGS. 5A and 5B describe a general process of calibration, measurement and then data processing. Alternatively, calibration can be performed at the beginning of the operation followed by repeated measurements.

In the described embodiment of the present invention, the application of the described device is that of an OCM. The four thin film filters 10A-10D in the described embodiment of the present invention find the existence and strength of any signals in the DWDM channels. As illustrated by FIG. 4, the filter 10A finds signals in the wavelength channels at wavelengths $\lambda 1$, $\lambda 2$ and $\lambda 3$ and more information of these signals can be obtained, such as the power and optical signal-to-noise ratio (OSNR) in each channel over a large dynamic range. The analysis is performed in real time to obtain measurements and monitoring of the optical channels. With four thin film filters, the entire DWDM C-band, 1525 to 1565 nm, can be monitored. Different thin film filters allow the device to monitor other wavebands, the L-band, 1570 to 1610 nm, for example. Or, more thin film filters can be added to the FIG. 2A device so that both the C and L-bands can be monitored, for example.

Figure 6A:
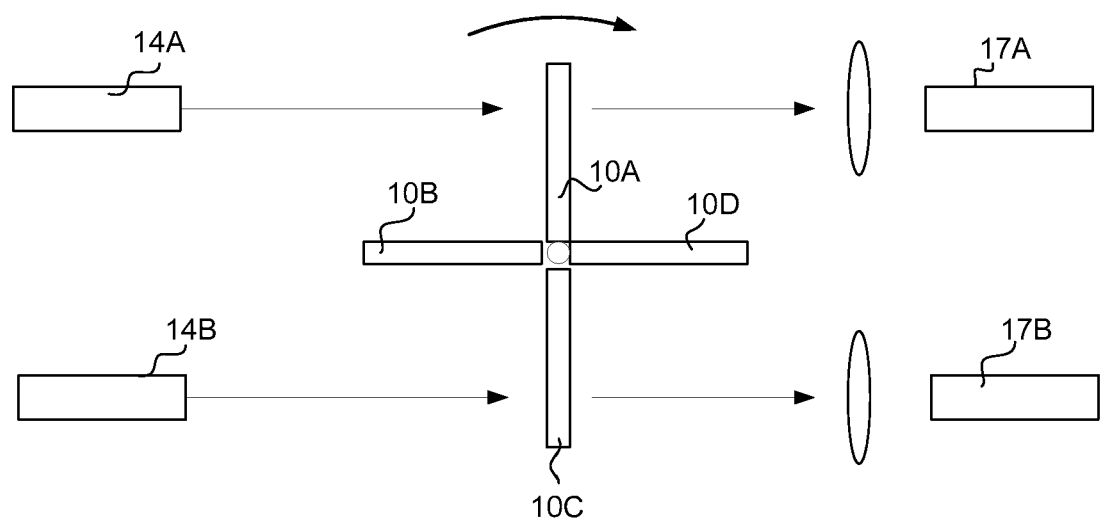
FIG. 6A shows an arrangement with two input units and corresponding detector units according to another embodiment of the present invention.
Figure 6B:
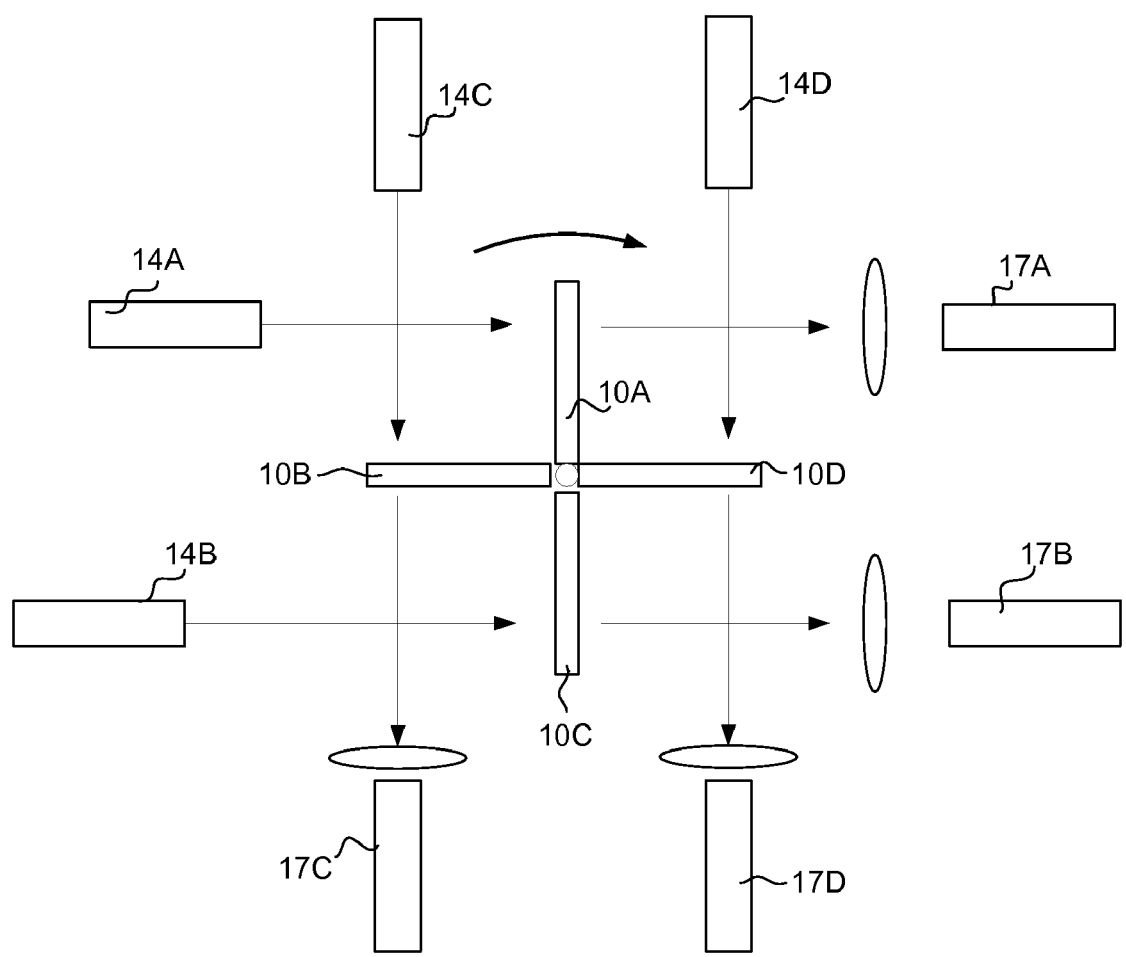
FIG. 6B shows another arrangement with four input units and corresponding detector units according to another embodiment of the present invention.
Figure 7:
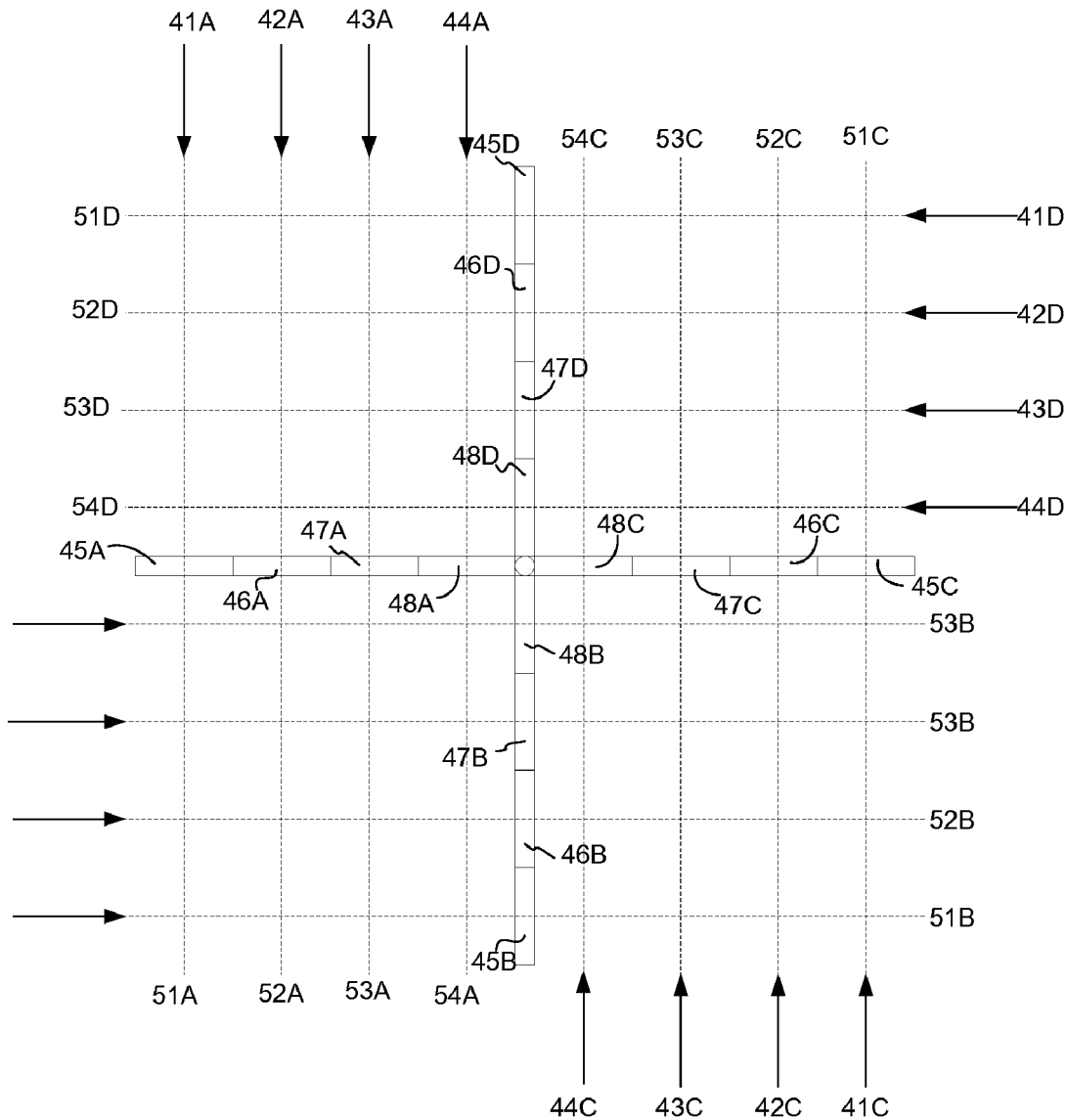
FIG. 7 shows an arrangement with 16 input units, corresponding 16 detector units and 16 thin film filters, according to still another embodiment of the present invention.

Other embodiments of the present invention incorporate more input units and corresponding detector units for increased functionality, as illustrated in FIGS. 6A, 6B and 7. In these drawings the rotating wheel 11 of FIG. 2A is omitted and only the thin film filters carried by the wheel are shown to better illustrate the arrangement of the added input units and detector units. In FIG. 6A two input units 14A, 14B and corresponding detector units 17A, 17B are shown. The second input unit 14B and detector unit 17B allow the OCM device to independently monitor the wavelength channels carried by another optical fiber, or optical waveguide, of the monitored network. In FIG. 6B four input units 14A-D and corresponding detector units 17A-D are shown. Four optical fibers or optical waveguides can be independently monitored.

FIG. 7 illustrates a device with 16 input units 41A-41D, 42A-42D, 43A-43D, 44A-44D, corresponding detector units 51A-51D, 52A-52D, 53A-53D, 54A-54D, and thin film filters 45A-45D, 46A-46D, 47A-47D and 48A-48D. The disclosed device can be viewed as a combination of four FIG. 6B devices. That is, one FIG. 6B device has four input units 41A-41D, corresponding detector units 51A-51D and thin film filters 45A-45D; a second FIG. 6B device has four input units 42A-42D, corresponding detector units 52A-52D and thin film filters 46A-46D; a third device has input units 43A-43D, corresponding detector units 53A-53D and thin film filters 47A-47D; and a fourth device has input units 44A-44D, corresponding detector units 54A-54D and thin film filters 48A-48D. Each set of thin film filters 51A-51D, 52A-52D, 53A-53D and 54A-54D filters light at different selected wavebands, preferably contiguous wavebands which form a larger section of the optical spectrum. According to the particular needs of the network monitoring, the section of the optical spectrum can be the same for all four sets of thin film filters, e.g., the section can be the DWDM C-band. In this case the OCM device is a four-in-one version of the FIG. 6B device. Alternatively, the sections can be different for scanning different portions of the optical spectrum, e.g., sections can include the DWDM C- and L-bands. Of course, other combinations of thin film filters can be used.

Again, it should be emphasized that the drawings of FIGS. 6A, 6B and 7 are representations to emphasize the multiple input, output and filter nature of embodiments of the present invention. In implementation, the arrangements of these drawings must be modified. For example, the thin film filters of the represented devices are mounted near the circumference of the rotating wheel so that the thin film filters can be optically interposed periodically between input units and corresponding detector units. As shown in FIG. 7 representation, the thin film filters are always optically interposed between the input units and detector units.

While the various embodiments of the present invention has been described as OCMs, it should readily evident that the present invention can be easily adapted as an analyzer device for measuring the various properties of light at multiple optical wavelengths. That is, the present invention provides for devices which can scan an optical spectrum over selected wavebands. Signal features in the selected wavebands can be readily identified by their particular wavelengths and can easily be subject to computer digital processing as required for the particular application and analysis. Such analyzer devices include optical performance monitors, optical wavelength meters, DWDM spectrum analyzers, optical spectrometers, and other instruments which analyze light by its constituent wavelengths.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A multiple optical wavelength analyzer device for measuring properties of light in a first waveguide, comprising:
    a first input unit attached to an end of said first waveguide directing said light in said first waveguide into a collimated beam;
    a first detector unit for receiving said light from said input unit;
    a plurality of thin film filters mounted to a rotatable table and arranged with respect to said first input unit and said first detector unit so that said plurality of thin film filters travel in a circle when rotating, a reflecting surface of each thin film filter generally perpendicular to the rotation, each thin film filter transmitting light of a particular wavelength to said first detector unit responsive to an angle of incidence of light from said first input unit upon said thin film filter when said thin film filter is optically interposed between said first input unit and said first detector unit;
    a motor for rotating said table, each of said plurality of thin film filters optically interposed between said first input unit and said first detector unit periodically and rotated so that said angle of incidence of light from said first input unit upon said thin film filter is varied when said thin film filter is optically interposed between said first input unit and said first detector unit; and
    a position sensor unit arranged with respect to said rotatable table and said plurality of thin film filters to receive light reflected from each thin film filter when said thin film filter is optically interposed between said first input unit and said first detector unit, output signals generated from said position sensor unit providing reference signals determining the rotational position of said rotatable table and said plurality of thin film filters and the wavelength of light transmitted through each of the thin film filter;
    whereby each thin film filter scans said light from said first waveguide by wavelength within a selected wavelength band into said first detector unit for measurement.

2. The device of claim 1 wherein wavelengths of said light received by said first detector unit are measured.

3. The device of claim 2 wherein power of said light received by said first detector unit is measured by wavelength.

4. The device of claim 2 wherein optical signal-to-noise ratio of said light received by said first detector unit is measured by wavelength.

5. The device of claim 1 wherein said input unit receives said light from a first waveguide.

6. The device of claim 5 wherein said first waveguide comprise an optical fiber.

7. The device of claim 1 wherein said device operates as an optical channel monitor for DWDM networks.

8. The device of claim 7 wherein said device monitors C-band channel signals.

9. The device of claim 7 wherein said device monitors L-band channel signals.

10. The device of claim 7 wherein said device monitors C- and L-band channel signals.

11. The device of claim 1 wherein said plurality of thin film filters comprise four thin film filters.

12. The device of claim 1 wherein said device measures properties of light in a second waveguide, said device further comprising:
    a second input unit attached to an end of said second waveguide directing said light from said second waveguide in a collimated beam; and
    a second detector unit for receiving said light from said second input unit;
    wherein said second input unit and said second detector unit are arranged with respect to said circle of said rotating thin film filters so that each thin film filter sends light of a particular wavelength to said second detector unit responsive to an angle of incidence of light from said second input unit upon said thin film filter when said thin film filter is optically interposed between said second input unit and said second detector unit, each of said plurality of thin film filters optically interposed between said second input unit and said second detector unit periodically and rotated so that said angle of incidence of light from said second input unit upon said thin film filter is varied when said thin film filter is optically interposed between said second input unit and said second detector unit;
    whereby each thin film filter scans said light from said second waveguide by wavelength within a selected wavelength band into said second detector unit for measurement.

13. The device of claim 12 wherein said second input unit directs light from said second waveguide parallel to said first input unit.

14. The device of claim 12 wherein said second input unit directs light from said second waveguide perpendicular to said first input unit.

15. The device of claim 12 wherein said device measures properties of light in a third waveguide, said device further comprising:
    a third input unit attached to an end of said third waveguide directing said light from said third waveguide; and
    a third detector unit for receiving said light from said third input unit;
    wherein said third input unit and said third detector unit are arranged with respect to said circle of said rotating thin film filters so that each thin film filter sends light of a particular wavelength to said third detector unit responsive to an angle of incidence of light from said third input unit upon said thin film filter when said thin film filter is optically interposed between said third input unit and said third detector unit, each of said plurality of thin film filters optically interposed between said third input unit and said third detector unit periodically and rotated so that said angle of incidence of light from said third input unit upon said thin film filter is varied when said thin film filter is optically interposed between said third input unit and said third detector unit.

16. The device of claim 15 wherein said device measures properties of light in a fourth waveguide, said device further comprising:
a fourth input unit attached to an end of said fourth waveguide directing said light from said fourth waveguide; and
a fourth detector unit for receiving said light from said fourth input unit;
wherein said fourth input unit and said fourth detector unit are arranged with respect to said circle of said rotating thin film filters so that each thin film filter sends light of a particular wavelength to said fourth detector unit responsive to an angle of incidence of light from said fourth input unit upon said thin film filter when said thin film filter is optically interposed between said fourth input unit and said fourth detector unit, each of said plurality of thin film filters optically interposed between said fourth input unit and said fourth detector unit periodically and rotated so that said angle of incidence of light from said fourth input unit upon said thin film filter is varied when said thin film filter is optically interposed between said fourth input unit and said fourth detector unit.

17. The device of claim 1 further comprising:
a second input unit attached to an end of a second waveguide directing light in said second waveguide into a collimated beam;
a second detector unit for receiving light from said second input unit;
a plurality of second thin film filters mounted to said rotatable table and arranged with respect to said second input unit and said second detector unit so that said plurality of second thin film filters travel in a second circle when rotating, a reflecting surface of each of said plurality of second thin film filters generally perpendicular to the rotation, each of said plurality of second thin film filters optically interposed between said second input unit and said second detector unit periodically, each second thin film filter sending light of a particular wavelength to said second detector unit responsive to a varying angle of incidence of light from said second input unit upon said second thin film filter when said second thin film filter is optically interposed between said second input unit and said second detector unit;
whereby each second thin film filter scans said light from said second waveguide by wavelength within a selected wavelength band into said second detector unit for measurement.

18. The device of claim 17 wherein said plurality of thin film filters and said plurality of second thin film filters are mounted at the same rotation locations on said table.

19. A method of measuring properties of light, comprising:
rotating a plurality of thin film filters such that a reflecting surface of each of the plurality of thin film filters is generally perpendicular to the rotation;
directing said light in a collimated beam at said plurality of thin film filters and toward a detector unit;
scanning said beam with said plurality of thin film filters repetitively with a period less than a second, each thin film filter having a characteristic wavelength, said plurality of thin film filters rotating between an input unit and said output unit at a constant speed, each thin film filter scanning said beam when said thin film filter is in optical interposition between said input unit and said output unit;
receiving said scanned beam in a plurality of wavebands by said detector unit, each of said scanned plurality of wavebands centered about a characteristic wavelength of each of said plurality of said thin film filters;
receiving light reflected from each thin film filter when said thin film filter is optically interposed between said first input unit and said first detector unit by a position sensor unit arranged with respect to said rotating plurality of thin film filters; and
generating reference output signals from said position sensor unit to determine the rotational position of said rotating plurality of thin film filters and wavelength of light received by said detector unit through each of the plurality of thin film filters to determine a wavelength of a signal feature in a scanned waveband by a temporal displacement of said signal feature from said characteristic wavelength.

20. The method of claim 19 wherein said directing step comprises directing said light from a waveguide through said input unit.

21. The method of claim 19 further comprising determining a signal strength of each signal feature in a scanned waveband.

22. The method of claim 19 wherein said scanned temporal displacement comprises a time difference in said scanned waveband between appearances of said signal feature and a reference point set by said characteristic wavelength of one of plurality of said thin film filters.

23. The method of claim 19 wherein said scanned temporal displacement comprises a time difference in said scanned waveband between mirrored appearances of said signal feature about a reference point set by said characteristic wavelength of one of plurality of said thin film filters.

24. A multiple optical wavelength analyzer device for measuring properties of light, comprising:
means for rotating a plurality of thin film filters in a circle, a reflecting surface of each of said plurality of second thin film filters generally perpendicular to the rotation;
means for directing said light from an input unit at said plurality of thin film filters in a collimated beam and toward a detector unit;
means for scanning said beam with said plurality of thin film filters repetitively with a period less than a second, each thin film filter having a characteristic wavelength, said plurality of thin film filters rotating between input unit and said output unit at a constant speed, each thin film filter scanning said beam when said thin film filter is in optical interposition between said input unit and said detector unit;
means for receiving said scanned beam in a plurality of wavebands, each of said scanned plurality of wavebands centered about a characteristic wavelength of each of said plurality of said thin film filters;
means for receiving light reflected from each thin film filter when said thin film filter is optically interposed between said first input unit and said first detector unit by a position sensor unit arranged with respect to said rotating plurality of thin film filters; and
means for generating reference output signals from said position sensor unit to determine the rotational position of said rotating plurality of thin film filters and wavelength of light received by said detector unit through each of the plurality of thin film filters to determine a wavelength of a signal feature in a scanned waveband by a temporal displacement of said signal feature from said characteristic wavelength.

25. The device of claim 17 wherein said plurality of thin film filters and said plurality of second thin film filters filter light at different selected wavebands.

* * * * *